US010165091B1

(12) United States Patent
Bittfield et al.

(10) Patent No.: US 10,165,091 B1
(45) Date of Patent: Dec. 25, 2018

(54) USER DEVICE PARAMETER ALLOCATION BASED ON INTERNET PROTOCOL VERSION CAPABILITIES

(71) Applicant: Sprint Communications Company L.P., Overland Park, KS (US)

(72) Inventors: Benjamin E. Bittfield, Lenexa, KS (US); Frederick C. Rogers, Olathe, KS (US); John H. Bennett, III, Lawrence, KS (US); Chidambaram Pavanasam, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 440 days.

(21) Appl. No.: 14/678,661

(22) Filed: Apr. 3, 2015

(51) Int. Cl.
*H04L 29/06* (2006.01)
*H04L 12/911* (2013.01)
*H04L 29/12* (2006.01)

(52) U.S. Cl.
CPC .......... *H04L 69/167* (2013.01); *H04L 47/781* (2013.01); *H04L 61/1511* (2013.01)

(58) Field of Classification Search
CPC .................................................. H04L 61/1511
See application file for complete search history.

(56) References Cited

U.S. PATENT DOCUMENTS

| | | | |
|---|---|---|---|
| 6,912,219 B2 | 6/2005 | Tsuchiya et al. | |
| 7,228,359 B1 * | 6/2007 | Monteiro | H04L 29/12066 709/228 |
| 7,404,008 B2 * | 7/2008 | Takeuchi | H04L 29/12066 370/392 |
| 7,526,562 B1 * | 4/2009 | Samprathi | H04L 29/12066 370/466 |
| 8,055,790 B1 * | 11/2011 | Bennett, III | H04L 29/12066 709/238 |
| 9,843,554 B2 * | 12/2017 | Thornewell | H04L 61/1511 |
| 2001/0040895 A1 | 11/2001 | Templin | |
| 2002/0145993 A1 | 10/2002 | Chowdhury et al. | |
| 2007/0201483 A1 | 8/2007 | Gerasimov et al. | |
| 2009/0129280 A1 | 5/2009 | Stout et al. | |

(Continued)

FOREIGN PATENT DOCUMENTS

| CN | 101827133 A | * | 9/2010 |
|---|---|---|---|
| CN | 101827133 A | * | 9/2010 |

OTHER PUBLICATIONS

Xiabo et al, Addressing analyzing device, IPv4 network access method and system CN 101827133A, Publication Date Sep. 8, 2010.*

(Continued)

*Primary Examiner* — Lashonda T Jacobs

(57) ABSTRACT

Methods and systems are provided for allocating user device parameters based on one or more Internet Protocol versions with which a user device is capable of communicating. An indication is received that the user device is requesting to be authenticated in a wireless communications network. It is determined that the user device is capable of communicating in the wireless communications network using IPv6 only. One or more configurable user device parameters, such as a DNS server, are assigned to the user device based, at least, on the user device being capable of communicating using IPv6 only and not IPv4 only or IPv6 and IPv4. This eliminates a need for a new APN to be configured on the user device.

13 Claims, 6 Drawing Sheets

(56) References Cited

U.S. PATENT DOCUMENTS

| | | |
|---|---|---|
| 2009/0241167 A1 | 9/2009 | Moore |
| 2009/0304026 A1 | 12/2009 | Hamada |
| 2011/0047033 A1 | 2/2011 | Mahaffey et al. |
| 2011/0075675 A1 | 3/2011 | Koodli et al. |
| 2011/0088080 A1* | 4/2011 | Stupar .................. H04W 12/08 726/4 |
| 2011/0211553 A1 | 9/2011 | Haddad |
| 2011/0249636 A1 | 10/2011 | Cherian et al. |
| 2012/0202491 A1 | 8/2012 | Fox et al. |
| 2012/0324094 A1 | 12/2012 | Wyatt et al. |
| 2013/0019311 A1 | 1/2013 | Swildens et al. |
| 2013/0156038 A1 | 6/2013 | Willars et al. |
| 2013/0212240 A1* | 8/2013 | Thornewell ......... H04L 61/1511 709/223 |
| 2013/0235871 A1* | 9/2013 | Brzozowski ............ H04L 69/08 370/392 |
| 2013/0254423 A1* | 9/2013 | George, IV ......... H04L 61/1511 709/238 |
| 2014/0003233 A1* | 1/2014 | Rune .................... H04L 47/125 370/230 |
| 2014/0189160 A1* | 7/2014 | Haddad ................ H04L 61/251 709/245 |
| 2015/0074221 A1* | 3/2015 | Kuparinen ....... H04L 29/12066 709/214 |
| 2015/0113172 A1 | 4/2015 | Johnson et al. |
| 2015/0195199 A1* | 7/2015 | Suryavanshi ......... H04L 45/741 370/352 |
| 2015/0207775 A1 | 7/2015 | Zou et al. |
| 2016/0036943 A1 | 2/2016 | Kish et al. |
| 2016/0344688 A1* | 11/2016 | Lakhera ................ H04L 61/251 |

OTHER PUBLICATIONS

Non-Final Office Action dated May 30, 2017 in U.S. Appl. No. 14/819,180, 22 pages.
First Action Interview Pre-Interview Communication dated Sep. 1, 2017 in U.S. Appl. No. 14/947,117, 4 pages.
First Action Interview Pre-Interview Communication dated Oct. 19, 2017 in U.S. Appl. No. 14/947,295, 4 pages.
First Action Interview Office Action dated Nov. 9, 2017 in U.S. Appl. No. 14/947,295, 25 pages.
First Action Interview Office Action dated Nov. 9, 2017 in U.S. Appl. No. 14/947,117, 23 pages.
Non-Final Office Action dated Apr. 12, 2018 in U.S. Appl. No. 14/947,295, 25 pages.
Non-Final Office Action dated Apr. 2, 2018 in U.S. Appl. No. 14/947,117, 25 pages.
Non-Final Office Action dated Jun. 15, 2018 in U.S. Appl. No. 14/819,180, 17 pages.
Non-Final Office Action dated Dec. 11, 2017 in U.S. Appl. No. 14/819,180, 22 pages.

* cited by examiner

USER DEVICE PARAMETER ALLOCATION BASED ON INTERNET PROTOCOL VERSION CAPABILITIES

SUMMARY

A high-level overview of various aspects of the invention is provided here for that reason, to provide an overview of the disclosure and to introduce a selection of concepts that are further described below in the detailed description section below. This summary is not intended to identify key features or essential features of the claimed subject matter, nor is it intended to be used as an aid in isolation to determine the scope of the claimed subject matter.

In brief, and at a high level, this disclosure describes, among other things, systems and methods for allocating configurable user device parameters to user devices during or after authentication. For example, a particular DNS server in a network is typically assigned to a user after a user device is authenticated and authorized. In aspects herein, DNS servers and other configurable user device parameters are assigned to user devices based on a communications type of the user devices, such as, for example, the user device being capable of communicating using IPv4 only, IPv6 only, or both IPv4 and IPv6 (e.g., a dual-stack device). As described herein, a different DNS server, or a different instance of a DNS server than would otherwise be assigned to an IPv4-only user device or a dual-stack device, is assigned to a user device that is capable of communications using IPv6 only. This eliminates the need for a new APN to be configured on IPv6-only user devices, and also eliminates the unnecessary DNS64 synthesizing for network address translation that would otherwise be performed on IPv4 or IPv4v6 (e.g., dual stack devices) that could potentially impair IPv4 traffic.

BRIEF DESCRIPTION OF THE DRAWINGS

Illustrative embodiments of the present invention are described in detail below with reference to the attached drawing figures, and wherein.

DETAILED DESCRIPTION

Figure 1:
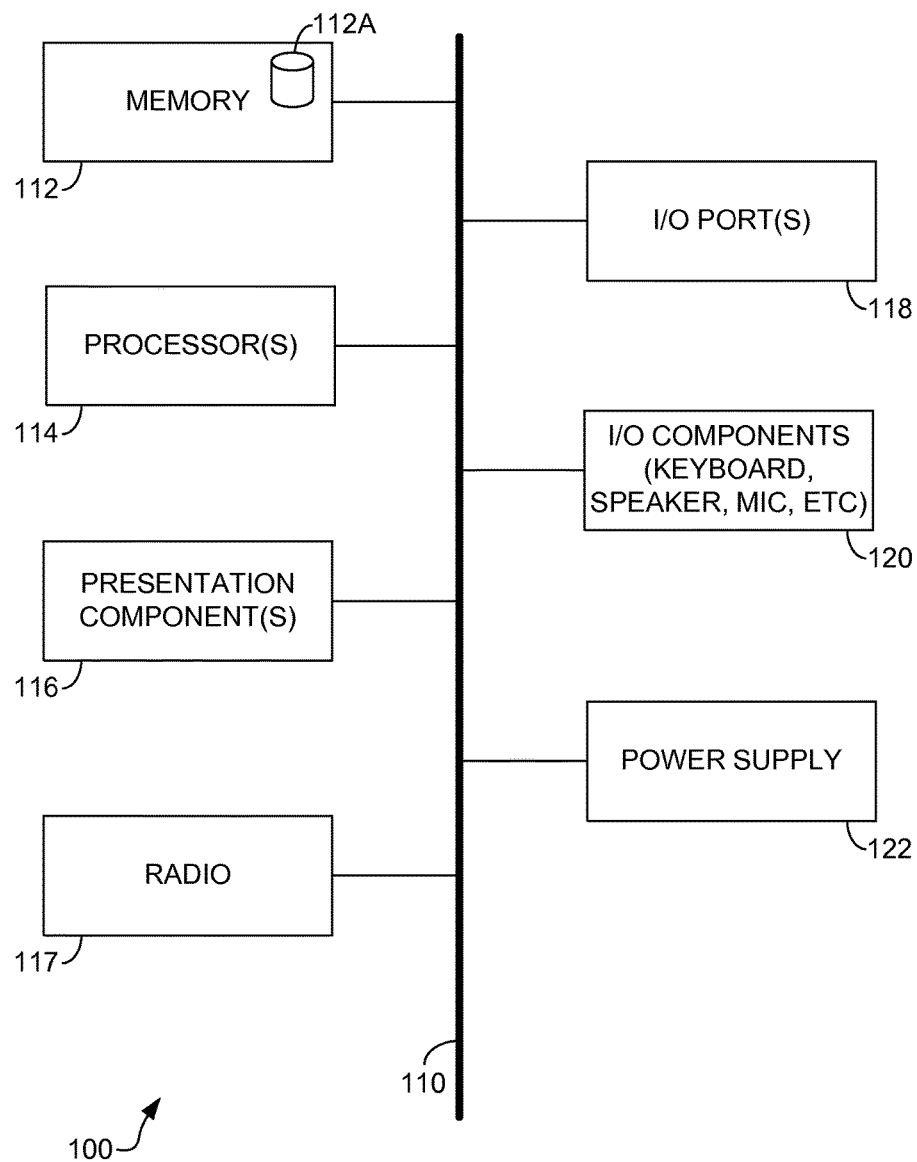
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AMBR Aggregate Maximum Bit Rate
APN Access Point Name
BS Base Station
CDMA Code Division Multiple Access
DNS Domain Name System
eNodeB Evolved Node B
GPRS General Packet Radio Service
GSM Global System for Mobile Communications
IP Internet Protocol
IPv4 Internet Protocol Version 4
IPv6 Internet Protocol Version 6
LTE Long-Term Evolution
PDN Packet Data Network
PGW PDN Gateway
QoS Quality of Service
WCDMA Wideband Code Division Multiple Access Further, various technical terms are used throughout this description. An illustrative resource that fleshes out various aspects of these terms can be found in Newton's Telecom Dictionary, 27th Edition (2012).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any informationdelivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Aspects of the present invention are directed towards allocating configurable user device parameters based, at least, on the communications capabilities of a user device that is requesting authorization on the wireless communications device. For instance, a user device that is IPv6 capable only may be assigned different parameters than a device that is either IPv4-capable only or dual stack, capable of communicating via both IPv4 and IPv6. In one aspect, it is advantageous to assign a different DNS server or a different instance of an existing DNS server to user devices that are IPv6 capable only. When the same IPv6 address is assigned, by the same DNS server, to both IPv6 only user devices and dual-stack devices, for example, an overlap of assigned IPv6 addresses may occur, causing one or more signals to break, resulting in decreased user experience.

As such, in aspects herein, a different DNS server, or at least a different instance of a DNS server, is assigned by a network gateway, such as a PDN gateway, to an IPv6-only user after authentication. In addition to the advantages mentioned above, a new APN would not need to be configured on IPv6-only user devices. Configuring new APNs is costly and time consuming.

Accordingly, in a first aspect, a computerized method carried out by at least one server having one or more processors for allocating user device parameters based on one or more Internet Protocol versions with which a user device is capable of communicating is provided. The method comprises receiving an indication that the user device is requesting to be authenticated in a wireless communications network, determining that the user device is capable of communicating in the wireless communications network using Internet Protocol version 6 (IPv6) only, and assigning one or more configurable user device parameters to the user device based on the user device being capable of communicating using IPv6 only and not Internet Protocol version 4 (IPv4) only or IPv6 and IPv4, thereby eliminating a need for a new access point name (APN) to be configured on the user device.

In a second aspect, one or more computer-storage media are provided having computer-executable instructions embodied thereon that, when executed, perform a method for allocating user device parameters based on one or more Internet Protocol versions with which a user device is capable of communicating. The method comprises receiving an indication that the user device is requesting to be authenticated in a wireless communications network, determining that the user device is capable of communicating in the wireless communications network using IPv6 only, and assigning a DNS server to the user device that is a different server or is a different instance of other DNS servers assigned to other user devices that are capable of communicating using IPv4 only or that are capable of communicating using both IPv6 and IPv4. This eliminates a need for a new APN to be configured on the user device. Further, the method comprises receiving a request from the user device to access content from a website, accessing the assigned DNS server to retrieve an IPv6 address for the user device, and communicating the content from the website to the user device.

In a third aspect, a system is provided for allocating user device parameters based on one or more Internet Protocol versions with which a user device is capable of communicating. The system includes a processor and one or more computer-readable media storing computer-useable instructions that, when used by the processor, cause the processor to receive an indication that the user device is requesting to be authenticated in a wireless communications network, determine that the user device is capable of communicating in the wireless communications network using Internet Protocol version 6 (IPv6) only, and assign a DNS server to the user device that is different than other DNS servers assigned to other user devices that are capable of communicating using IPv4 only or that are capable of communicating using both IPv6 and IPv4. This eliminates a need for a new APN to be configured on the user device.

Referring to the drawings in general, and initially to FIG. 1 in particular, a block diagram of an illustrative mobile device according to one embodiment is provided and referenced generally by the numeral 100. Although some components are shown in the singular, they may be plural. For example, the user device 100 might include multiple processors or multiple radios, etc. As illustratively shown, the user device 100 includes a bus 110 that directly or indirectly couples various components together, including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that the memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short.

The processor 114 might actually be multiple processors that receive instructions and process them accordingly. The presentation component 116 includes the likes of a display, a speaker, as well as other components that can present information (such as a lamp (LED), or even lighted keyboards).

Numeral 117 represents a radio(s) or antenna that facilitates communication with a wireless telecommunications network including, for example, a base station or eNodeB associated with the wireless telecommunications network. Illustrative wireless-telecommunications technologies include CDMA, GPRS, TDMA, GSM, and the like. The radio/antenna 117 might additionally or alternatively facilitate other types of wireless communications including Wi-Fi, WiMAX, LTE, or other VoIP communications. As can be appreciated, in various embodiments, the radio/antenna 117 can be configured to support multiple technologies, and/or multiple radios/antennas can be utilized to support multiple technologies.

The input/output port 118 might take on a variety of forms. Illustrative input/output ports include a USB jack, stereo jack, infrared port, proprietary communications ports, and the like. The input/output components 120 include items such as keyboards, microphones, speakers, touch screens, and any other item usable to directly or indirectly input data into the user device 100. The power supply 122 includes items such as batteries, fuel cells, or any other component that can act as a power source to power the user device 100.

Figure 2:
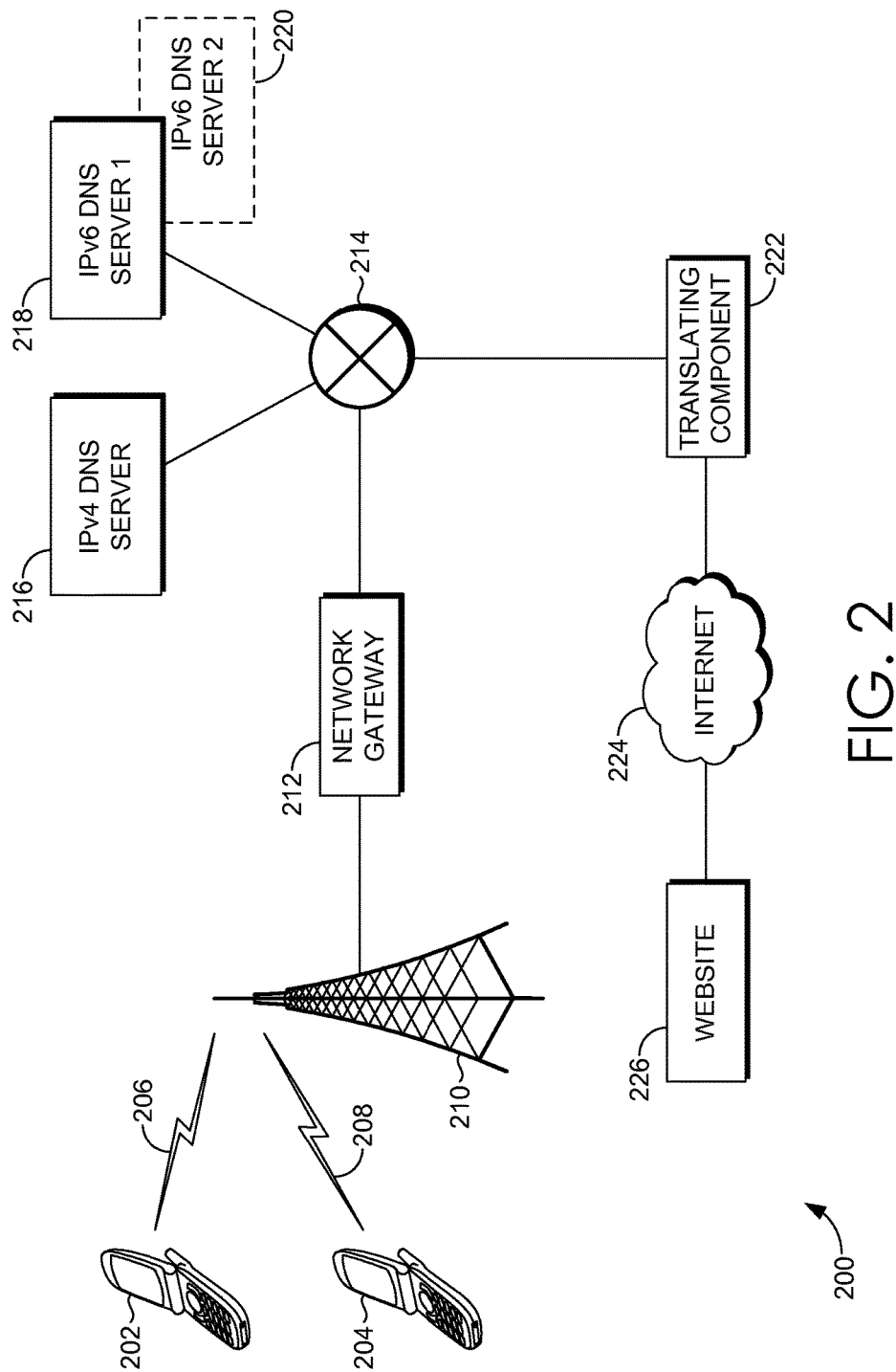
FIG. 2 depicts an illustrative operating system for use in practicing aspects of the technology.

Turning to FIG. 2, an illustrative operating system is depicted for use in practicing an embodiment of the technology, and is generally referred to herein as environment 200. Environment 200 is but one example of a suitable environment and is not intended to suggest any limitation as to the scope of use or functionality of embodiments herein. Neither should the environment be interpreted as having any dependency or requirement relating to any one or combination of components illustrated.

In the environment 200, two user devices 202 and 204 are illustrated and are able to communicate with other user devices (e.g., a mobile device(s), a server(s), a personal computer(s), etc.) and/or with a base station, such as a base station of cell tower 210, by way of a wireless communications network. The wireless communications network might include an array of devices or components, some of which are not shown so as not to obscure more relevant aspects of the invention. Components of environment 200 that may be part of the network may include the gateway 212, the IPv4 DNS server 216, the IPv6 DNS server 1 (item 218), the IPv6 DNS server 2 (item 220), and the translating component 222. Components such as terminals, links, and nodes (as well as other components) can provide connectivity in some embodiments. The network can include multiple networks, as well as being a network of networks. The network can be part of a telecommunications network that connects subscribers or users to their immediate service provider. In embodiments, the network can be associated with a telecommunications provider that provides services to mobile devices, such as the user devices 202 and 204. For example, the network may provide voice and/or data services to mobile devices or corresponding users that are registered to utilize the services provided by a telecommunications provider. The network can be any communications network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

While two user devices 202 and 204 are illustrated in environment 200, it should be understood that any number of user devices may communicate with cell tower 210 by way of a wireless communications network. For instance, in some geographical areas, some cell towers may serve large quantities of user devices, while in other areas, cell towers may serve smaller quantities of user devices. As such, the quantity of user devices illustrated in environment 200 is shown just for exemplary purposes, and is not meant to limit embodiments presented herein in any way.

A user device, as used herein, is a device that has the capability of using a wireless communications network. A user device may take on a variety of forms, such as a personal computer (PC), a laptop computer, a tablet, a mobile phone, a personal digital assistant (PDA), a server, or any other device that is capable of communicating with other devices using a wireless telecommunications network. In one embodiment, a user device is the user device described in relation to FIG. 1 herein.

As mentioned, to access the wireless communications network, the user devices 202 and 204 may be in communication with a base station (included within cell tower 210) via wireless telecommunications links such as, for example, wireless-telecommunications links 206 and 208, respectively, which allow for data to be wirelessly communicated between the user devices 202 and 204, and the cell tower 210. The user devices 202 and 204 may communicate with the base station via the wireless-telecommunications links 206 and 208, respectively, to facilitate attachment of the user devices 202 and 204 to the base station. Once attached, the user devices 202 and 204 may also use the wireless-telecommunications links 206 and 208 to send and/or receive voice call information and/or data information as well as information concerning device capabilities. In one aspect, the user devices 202 and 204 may utilize the wireless-telecommunications links 206 and 208 to send requests for content from a web-based service, such as, for example, website 226.

It should be mentioned that although the term "base station" is used throughout this application, equivalent terms may include radio access node, eNodeB, and Node B. For example, if the wireless communications system utilizes LTE, the base station would be termed eNodeB. Additionally, embodiments of the present invention may be used with different technologies or standards, including, but not limited to, CDMA 1×A, GPRS, EvDO, TDMA, GSM, WiMax technology, LTE, and LTE Advanced.

The network gateway 212 is the link between the user devices and access to websites, such as website 226 by way of the Internet 224. In one embodiment, the network gateway 212 is a packet data network (PDN) gateway (P-GW). The network gateway 212 may be responsible for allocating various user device parameters to the user devices during the authentication process. Additionally, the user devices may be connected to multiple network gateways, instead of just one, as shown in FIG. 2. In aspects described herein, the network gateway 212 assists with the authentication process, as well as when a user device requests to access content from a website.

In aspects described herein, the network gateway 212 is the component that assigns or allocates various parameters to user devices during authentication of those user devices onto the network. As will be described further herein, the network gateway 212 utilizes logic that allows it to determine, for example, which DNS server to assign to a particular user device. In part, this assignment is based on the IP version capabilities of the user device. In an embodiment, requests from a user device 202 or 204 are sent through the network gateway 212 and when an IP address is needed, a router 214 routes the request to one or more of the DNS servers (items 216, 218, and 220).

The IPv4 DNS server 216 and the IPv6 DNS servers 1 and 2 (items 218 and 220), as used herein, are hierarchical distributed naming systems for computers or services that are connected to the Internet. In one instance, the IPv4 DNS server 216 and the IPv6 DNS servers 1 and 2 (items 218 and 220) are domain name system (DNS) servers, but in other embodiments, it may be any other type of server used to store such information. In aspects herein, the IPv4 DNS server 216 and the IPv6 DNS servers 1 and 2 (items 218 and 220) translate domain names to IP addresses, and thus are the Internet's primary directory service. These servers, such as DNS servers, map hostnames to IPv4 or IPv6 addresses. The IPv4 DNS server 216 and the IPv6 DNS servers 1 and 2 (items 218 and 220) may distribute the responsibility of assigning domain names and mapping those names to IP addresses by the use of multiple authoritative name servers or by the use of sub-servers for each domain. In embodiments, the IPv4 DNS server 216 receives type "A" queries requesting an IPv4 address. For example, when an "A" query is received, as defined in RFC 1035, the A record in the server includes a 32-bit IPv4 address, which can then be returned.

As shown in FIG. 2, item 218 is the IPv6 DNS server 1, while item 220 is the IPv6 DNS server 2. In embodiments, IPv6 DNS server 2 (item 220) may not be a completely separate server from IPv6 DNS server 1 (item 218), but may be a different instance of IPv6 DNS server 1 (item 218). As such, throughout this paper, when we refer to item 220 as a separate server, it may be a different instance of server 218. In embodiments, the IPv6 DNS servers 1 and 2 (items 218 and 220) receive type "AAAA" queries (quad-A queries) requesting an IPv6 address. For example, when an "AAAA" query is received, as defined in RFC 3596, the AAAA record (quad-A record) in the server includes a 128-bit IPv6 address, which can then be returned.

Currently, Evolved Packet System (EPS) bearer parameters are typically specified at the APN level within the network gateway 212. For user devices having IPv4-only capabilities or IPv4 and IPv6 capabilities (e.g., a dual-stack user device), there are no issues with breaking of sessions, as the IPv4 DNS server 216 and the IPv6 DNS server 1 (item 218) can be assigned to those user devices without conflict. However, for user devices having IPv6 capabilities only, a different DNS server may be assigned during authentication. To eliminate the need to construct a different APN for IPv6-only user devices, a second IPv6 address is used, as the first will have already been allocated to serve user devices capable of both IPv4 and IPv6. Attempting to reuse a single IPv6 address would break the sessions of the user devices capable of both IPv4 and IPv6. As such, aspects described herein prohibit the need to create new APNs strictly to modify EPS bearer parameters for user devices capable of IPv4 only, IPv6 only, or IPv4 and IPv6. Creating multiple APNs simply for different types of user devices is costly and creates an unnecessarily complex network.

The translating component 222 is generally responsible for translating a user device's (having IPv6 capabilities only) IP address into an IPv4 address when the user device is attempting to communicate with, such as requesting content from, a website that has only IPv4 capabilities, in addition to translating (e.g., mapping) a translated IPv4 address back into an IPv6 address. Generally, a user device having IPv6 capabilities only is not able to receive content from a website, such as website 226, that has IPv4 capabilities only without some translations being done. The translating component 222, in embodiments, is a firewall or some other device that utilizes network address translation 64 (NAT64) technology, such as an NAT64 gateway. The NAT64 technology enables an IPv6-only user device to communicate with an IPv4-only website. In embodiments, the translating component 222 translates the user device's IPv6 address into an IPv4 address when the user device is requesting content from the website. This is done so the website will be able to respond to the request. When the data is sent back to the user device, the translating component 222 may also translate the IPv4 address back into an IPv6 address so that the data can reach the user device. More specifically, the translating component 222 may take the user device's IPv6 address and wrap an IPv4 header around it, and do the same when the data is sent back to the user device. In scenarios such as these, the IPv6-only user device will not even know that the translating occurred, as the process is seamless.

Figure 3:
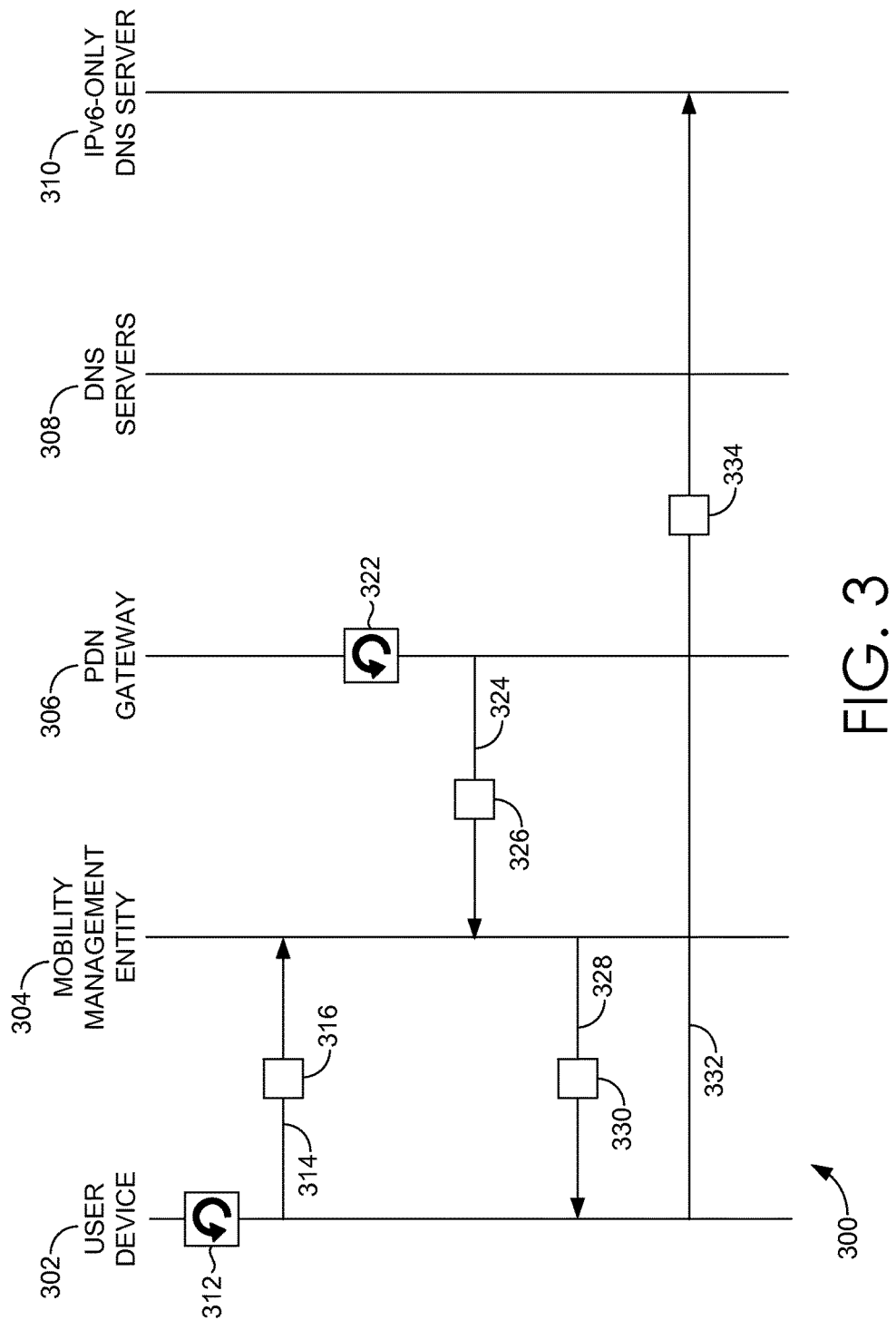
FIG. 3 depicts a flow diagram of an allocation of user device parameters based on one or more Internet Protocol versions with which a user device is capable of communicating, in accordance with aspects herein.

FIG. 3 depicts a flow diagram 300 of an allocation of user device parameters based on one or more Internet Protocol versions with which a user device is capable of communicating, in accordance with aspects herein. Illustrated in FIG. 3 are a user device 302, a mobility management entity 304, a PDN gateway 306, one or more DNS servers 308 that are assigned to devices other than IPv6-only devices, and an IPv6-only DNS server 310. DNS servers 308 may include DNS servers 216 and 218 of FIG. 2, while the IPv6-only DNS server 310 may include IPv6 DNS server 2 (item 220) of FIG. 2.

Initially, the user device 302 receives an indication that it is to authenticate with the network, represented by item 312. The user device 302 communicates 314 a request for authentication 316 to the mobility management entity 304, which forwards the request to the Home Subscriber Server (HSS) to authorize the user of the user device 302. The PDN gateway 306 determines that the user device 302 has requested to be authenticated, and determines allocation of one or more parameters, represented by item 322. One such parameter may be a DNS server that the user device 302 is to use for the duration of this session. Once allocated, the PDN gateway 306 communicates 324 the parameter assignments 326 back to the mobility management entity 304, which forwards 328 the parameter assignments 330 to the user device 302. At some point, the user device 302 communicates 332 a request for content 334 through the PDN gateway 306 to its assigned DNS server which, here, is IPv6-only DNS Server 310. While the IPv6-only DNS server 310 may not be a physically separate server than the other DNS server utilized for dual-stack user devices, the request is logically sent directly to the IPv6-only DNS server 310. It should be noted that the IPv6-only DNS server 310 shown in FIG. 3 can be a physically separate server from other DNS servers, or may simply be another instance of another DNS server.

Figure 4:
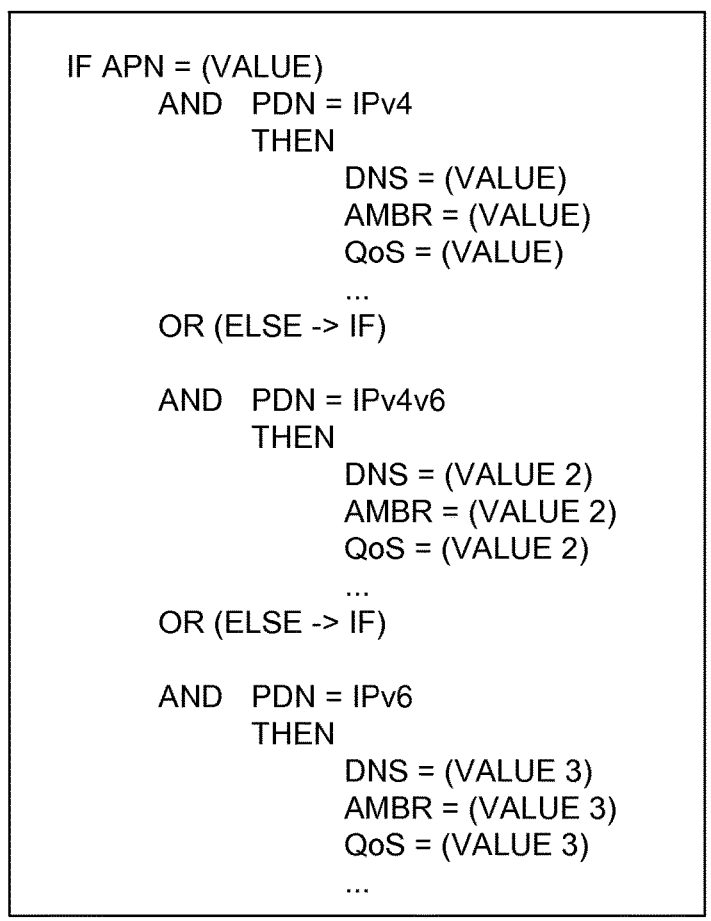
FIG. 4 depicts exemplary logic for allocating user device parameters based on one or more Internet Protocol versions with which a user device is capable of communicating, in accordance with aspects herein.

Turning now to FIG. 4, exemplary logic 400 for allocating user device parameters based on one or more Internet Protocol versions with which a user device is capable of communicating is illustrated, in accordance with aspects herein. In embodiments, the logic in FIG. 4 is executed by a network gateway, such as network gateway 212 of FIG. 2. This could be a PDN gateway. As shown, for a particular APN value, if the PDN type of the user device is IPv4 only, first values of the DNS server, Aggregate Maximum Bit Rate (AMBR), Quality of Service (QoS), and other parameters are allocated to that user device and that affect latency, user experience, and the like. The QoS may include multiple sub-parameters, including error rates, bandwidth, throughput, transmission delay, availability, jitter, etc. For the same APN value, if the PDN type of the user device is dual-stack, or capable of both IPv4 and IPv6 technologies, a second value of the DNS server, AMBR, QoS, and other parameters are allocated to that user device. For the same APN value, if the PDN type of the user device is IPv6 only, a third value of the DNS server, AMBR, QoS, and other parameters are allocated to that user device.

Figure 5:
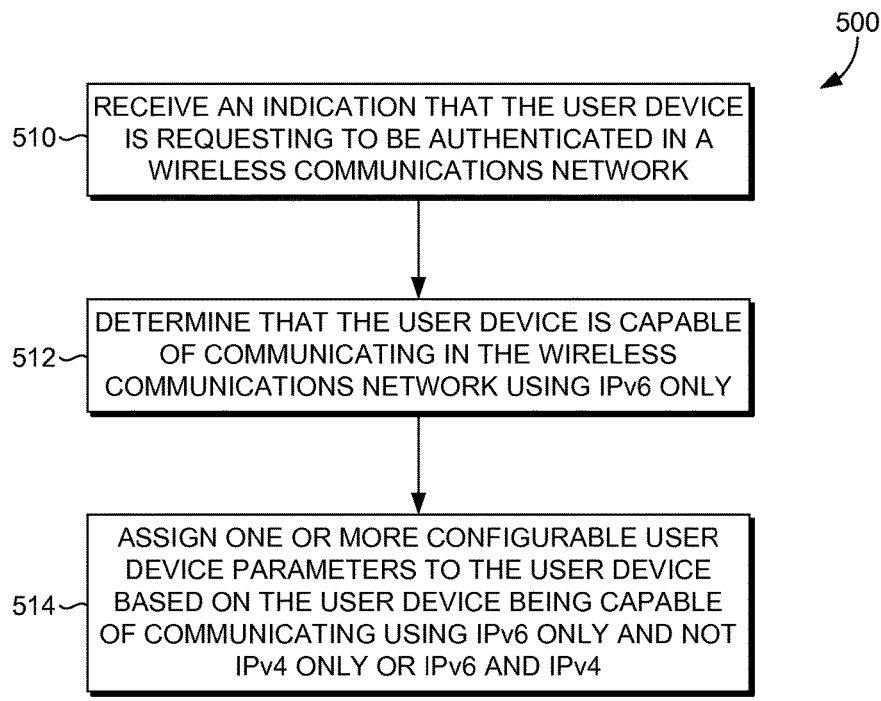
FIGS. 5-6 depict flow charts of exemplary methods of allocating user device parameters based on one or more Internet Protocol versions with which a user device is capable of communicating, in accordance with aspects herein.

FIG. 5 depicts a flow chart of an exemplary method 500 of allocating user device parameters based on one or more Internet Protocol versions with which a user device is capable of communicating, in accordance with an aspect herein. Initially at block 510, an indication is received that the user device is requesting to be authenticated in a wireless communications network. At block 512, it is determined that the user device is capable of communicating in the wireless communications network using IPv6 only. At block 514, one or more configurable user device parameters are assigned to the user device based on the user device being capable of communicating using IPv6 only, as opposed to being capable of communicating in the network using IPv4 only or both IPv4 and IPv6 (e.g., dual-stack device). In one aspect, a network gateway, such as a PDN gateway, assigns the configurable user device parameters to the user devices in the wireless communications network.

In the aspect described above, the IPv6-only user device may have the same access point name (APN) as the IPv4-only user device or dual-stack device, thus eliminating a need for a new APN to be configured on the user device. Having to configure a new APN on a user device would require the user device to be reprogrammed, and doing this reprogramming for many IPv6-only devices would be enormously costly and time consuming. In one aspect, one of the assigned configurable user device parameters is a DNS server, such as a DNS server. As mentioned herein, a different DNS server may be assigned to IPv6-only user devices, or a different instance of an existing DNS server may be assigned to IPv6-only user devices. In either case, the physically separate DNS server or the different instance of an existing DNS server, in aspects herein, is capable of providing DNS lookup and IPv4 synthesizing for IPv6-only user devices so that IPv4 synthesizing of IPv6 addresses for a dual-stack device is not performed, which could potentially impair IPv4 traffic. Synthesizing an IPv6 address in this way may cause a break in the signal for one or both of the IPv4 device or the dual-stack device.

The aspect described above in regards to the method 500 of FIG. 5 may further include receiving a request from the user device to access content from a website. The assigned DNS server may be accessed to retrieve an IPv6 address for the user device. As mentioned, the DNS server, such as a DNS server, is used to map or translate domain names into IP addresses. The content from the website is then communicated to the user device. As mentioned, if an IPv6-only user device is requesting content from an IPv6-only website, the IPv6 address of the user device may be translated by a translating component (e.g., firewall, NAT64) prior to the request being communicated to the website. When the content is returned from the website, the translated IPv4 address may be translated back into the original IPv6 address so that the content can seamlessly be delivered to the user device.

Figure 6:
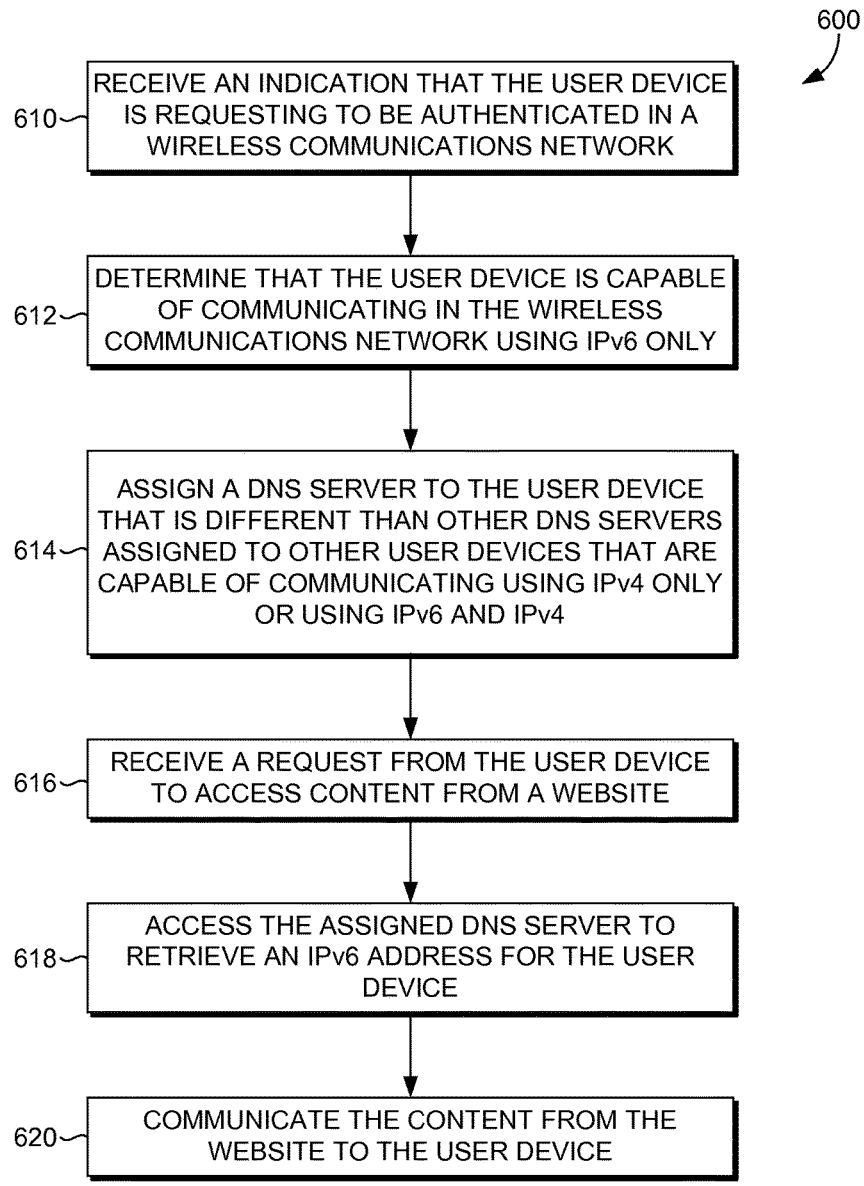

Referring now to FIG. 6, a flow chart is illustrated of an exemplary method 600 of allocating user device parameters based on one or more Internet Protocol versions with which a user device is capable of communicating, in accordance with an aspect herein. At block 610 of FIG. 6, an indication is received that the user device is requesting to be authenticated in a wireless communications network. At block 612, it is determined that the user device is capable of communicating in the network using IPv6 only. Based, at least in part, on this determination, a DNS server (e.g., different instance of a DNS server assigned to dual-stack devices) is assigned to the user device, shown at block 614. A network gateway, such as a PDN gateway, may be the network component, in aspects, that assigns DNS servers and other configurable user device parameters during authentication. The assigned DNS server may be a physically different server or a different instance of other DNS servers assigned to other user devices that are capable of communicating using IPv4-only or dual-stack devices. This eliminates a need for a new APN to be configured on the user device. As such, user devices that are capable of communicating using IPv6-only and dual-stack devices may use the same APN.

At block 616, a request is received from the user device to access content from a website. In one instance, the website may be one that is capable of communicating via IPv4 only. However, in other instances, the website may be capable of communicating via IPv6 only or both IPv4 and IPv6. At block 618, the assigned DNS server is accessed to retrieve an IPv6 address for the user device. Because the assigned DNS server is either a different DNS server than what is assigned to other user devices that are not IPv6 only, or is a different instance of an existing DNS server, overlap of IPv6 addresses will not be an issue. The content from the website is communicated to the user device at block 620.

As mentioned above in regard to FIG. 5, the IPv6 address assigned to the user device may be translated by a translating component before the request is sent to the website. When the content is received from the website into the wireless communications network, the translated IPv4 address may be translated back into the original IPv6 address assigned to the user device, allowing the user device to receive content from the website. This aspect may be utilized when the website is an IPv4-only website.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method carried out by at least one server having one or more processors for allocating user device parameters based on one or more Internet Protocol (IP) versions with which a first user device is capable of communicating, the method comprising:

receiving an indication that the first user device is requesting to be authenticated in a wireless communications network;

determining that the first user device is capable of communicating in the wireless communications network using Internet Protocol version 6 (IPv6) only;

assigning a first set of configurable user device parameters to the first user device based on the first user device being capable of communicating using IPv6 only and not Internet Protocol version 4 (IPv4) only or IPv6 and IPv4;

assigning a second set of configurable user device parameters is assigned to a different second user device that is capable of communicating using IPv4 only and not IPv6, wherein the second set of configurable user device parameters is different from the first set of configurable user device parameters;

assigning an access point name (APN), wherein the APN assigned to the first user device is the same APN assigned to the second user device;

receiving a request from the first user device to access content from a website;

accessing an assigned Domain Name System (DNS) server to retrieve an IPv6 address for the first user device;

translating the IPv6 address of the first user device to an IPv4 address prior to communicating the request to access content to the website;

translating the translated IPv4 address of the first user device into the IPv6 address prior to communicating the content from the website to the first user device; and communicating the content from the website to the first user device.

2. The method of claim 1, wherein the first set of user device parameters includes the DNS server, and wherein the translating is performed by a translating component.

3. The method of claim 2, wherein the assigned DNS server is a DNS server.

4. The method of claim 3, wherein the DNS server assigned to the first user device is a different DNS server than that assigned to second user device.

5. The method of claim 3, wherein the DNS server assigned to the first user device is a different instance of a DNS server assigned to the second user device.

6. The method of claim 1, wherein the website is capable of IPv4 communications only.

7. The method of claim 1, wherein a network gateway assigns the first set of configurable user device parameters and the second set of configurable user device parameters to the first user device and the second user device, respectively.

8. One or more computer-readable storage media having computer-executable instructions embodied thereon that, when executed, perform a method for allocating user device parameters based on one or more Internet Protocol (IP) versions with which a first user device is capable of communicating, the method comprising:

receiving an indication that the first user device is requesting to be authenticated in a wireless communications network;

determining that the first user device is capable of communicating in the wireless communications network using IP version 6 (IPv6) only, and assigning a first set of configurable user device parameters to the first user device capable of communicating in wireless communications network using IPv6 only;

assigning a Domain Name System (DNS) server to the first user device that is a different server or is a different instance of other DNS servers assigned to a second user devices that is capable of communicating using IP version 4 (IPv4) only or that are capable of communicating using both IPv6 and IPv4;

assigning an access point name (APN) to the first user device;

assigning the APN to the second user device, wherein the APN assigned to the first device is the same APN as is assigned to the second device;

receiving a request from the first user device to access content from a website;

accessing the assigned DNS server to retrieve a first set of configurable user device parameters including an IPv6 address for the first user device;

at a translating component, translating the IPv6 address assigned to the first user device by the assigned DNS server to an IPv4 address prior to communicating the request to access content to the website; and communicating the content from the website to the first user device.

9. The one or more computer-readable storage media of claim 8, wherein the IPv6 address is provided to the first user device based on the website from which the first user device is requesting the content.

10. The one or more computer-readable storage media, wherein the website is capable of communicating using IPv4 only.

11. The one or more computer-readable storage media of claim 8, wherein a packet data network (PDN) gateway (P-GW) assigns an Internet Protocol (IP) address server to the user device during authentication.

12. A system for allocating user device parameters based on one or more Internet Protocol versions with which a first user device is capable of communicating, the system comprising:

a processor; and one or more computer-readable storage media storing computer-useable instructions that, when used by the processor, cause the processor to:

receive an indication that the first user device is requesting to be authenticated in a wireless communications network, determine that the first user device is capable of communicating in the wireless communications network using Internet Protocol version 6 (IPv6) only, and assign a first set of configurable user device parameters to the first user device capable of communicating in wireless communications network using IPv6 only, assign a Domain Name Server (DNS) server to the first user device that is different than other DNS servers assigned to a second user devices that is capable of communicating using IP version 4 (IPv4) only or that are capable of communicating using both IPv6 and IPv4, and assign a second set of configurable user device parameters to the second user device capable of communicating in wireless communications network using IPv4 only or that are capable of communicating using both IPv6 and IPv4;

assigning an access point name (APN) to the first user device;

assigning the APN to the second user device, wherein the APN assigned to the first user device is the same as is assigned to the second device;

receiving a request from the first user device to access content from a website;

access an assigned DNS server to retrieve a first set of configurable user device parameters including an IPv6 address for the first user device;

translate the IPv6 address assigned to the first user device by the assigned DNS server to an IPv4 address prior to communicating the request to access content to the website;

translate the translated IPv4 address of the first user device into the IPv6 address prior to communicating the content from the website to the first user device.

13. The system of claim 12, further comprising a translating component that, translates the IPv6 address assigned to the first user device by the assigned DNS server to the IPv4 address prior to communicating the request from the first user device to access content to the website, and translates the translated IPv4 address of the first user device into the IPv6 address prior to communicating the content from the website to the first user device.

* * * * *